July 23, 1968 G. MAES 3,394,034
SALT WATER ELECTROLYTE BATTERY DEVICE
Filed March 1, 1966 6 Sheets-Sheet 1
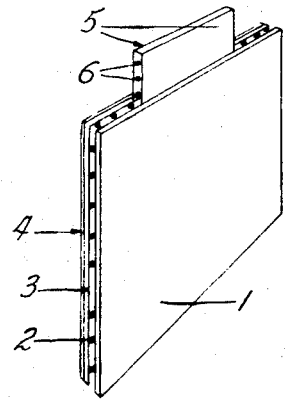
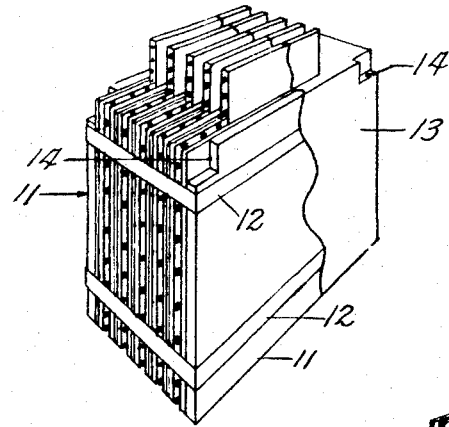
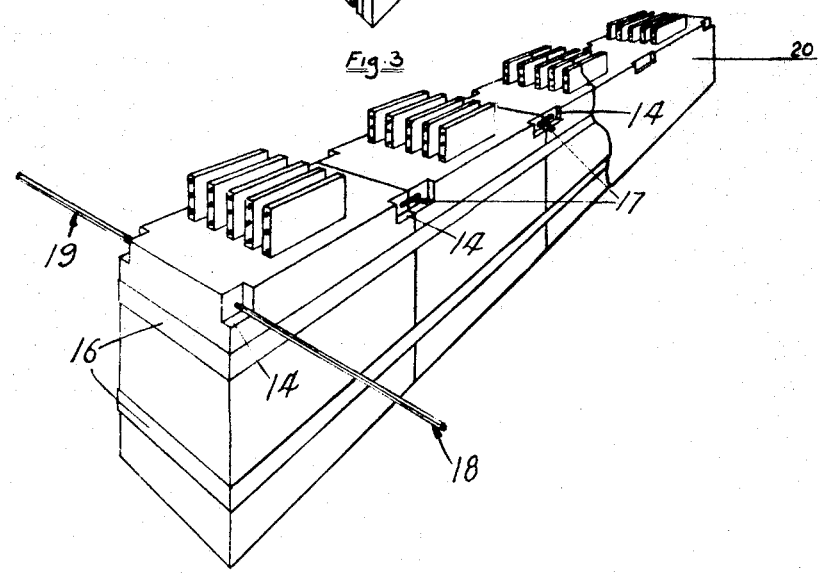

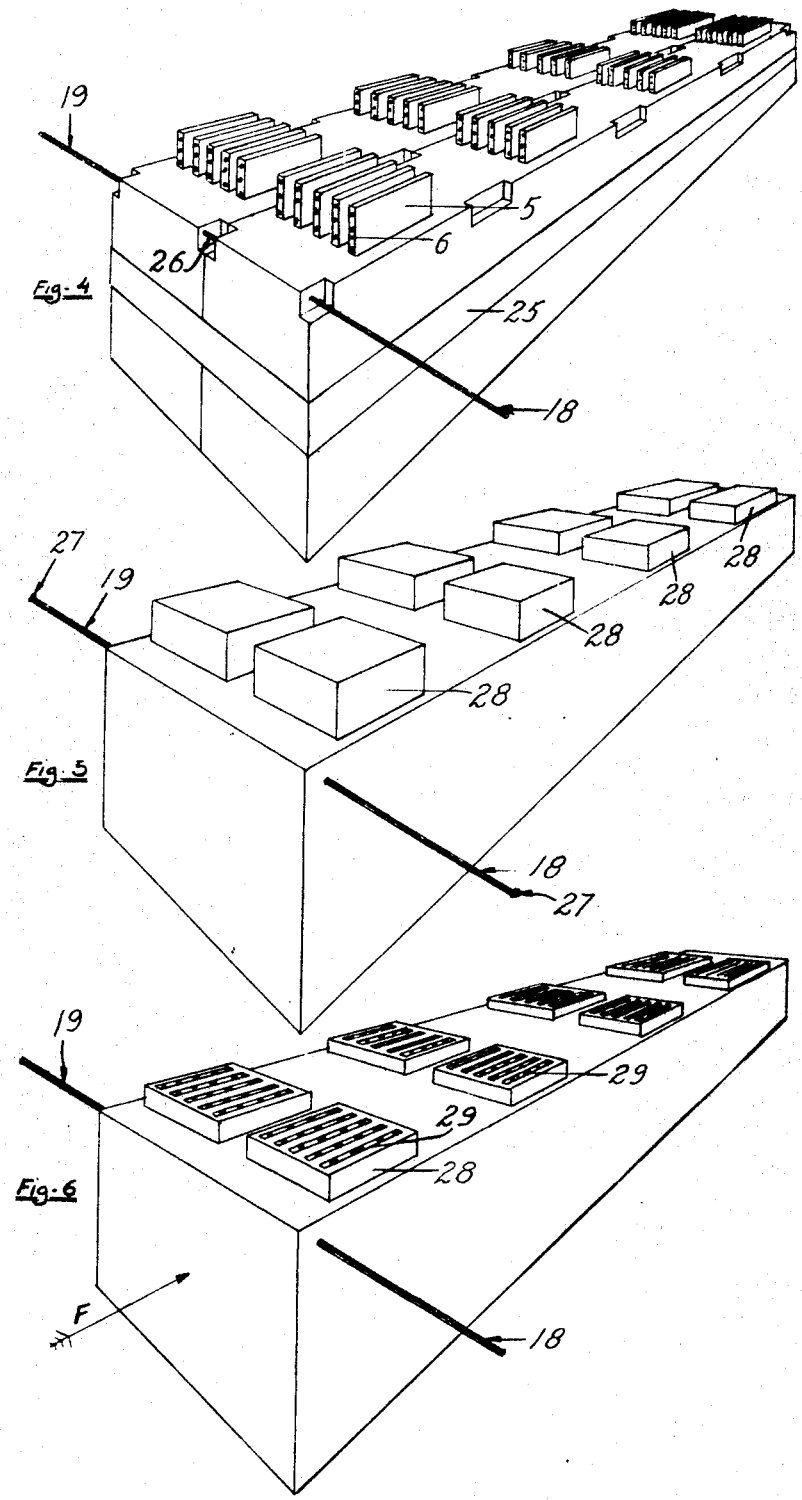

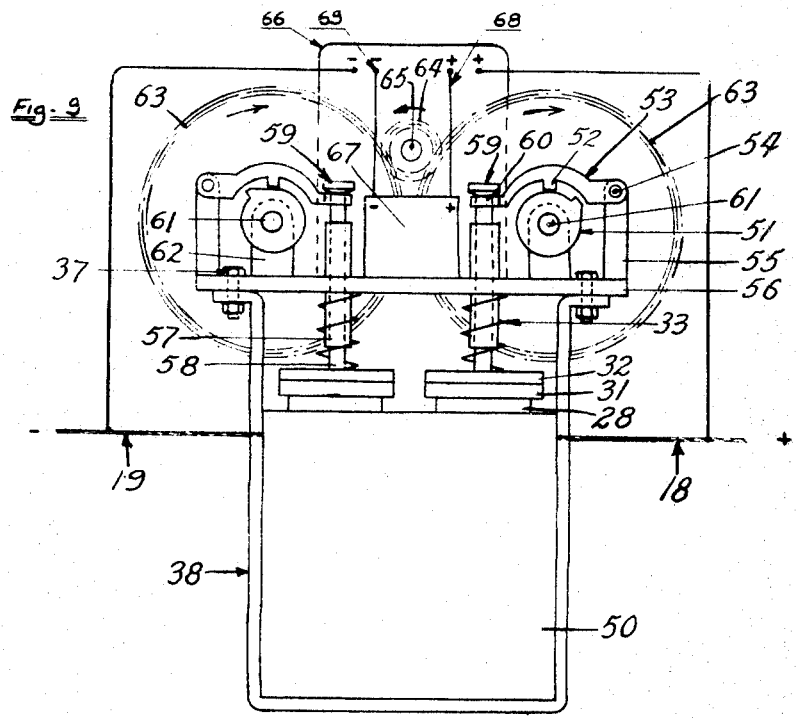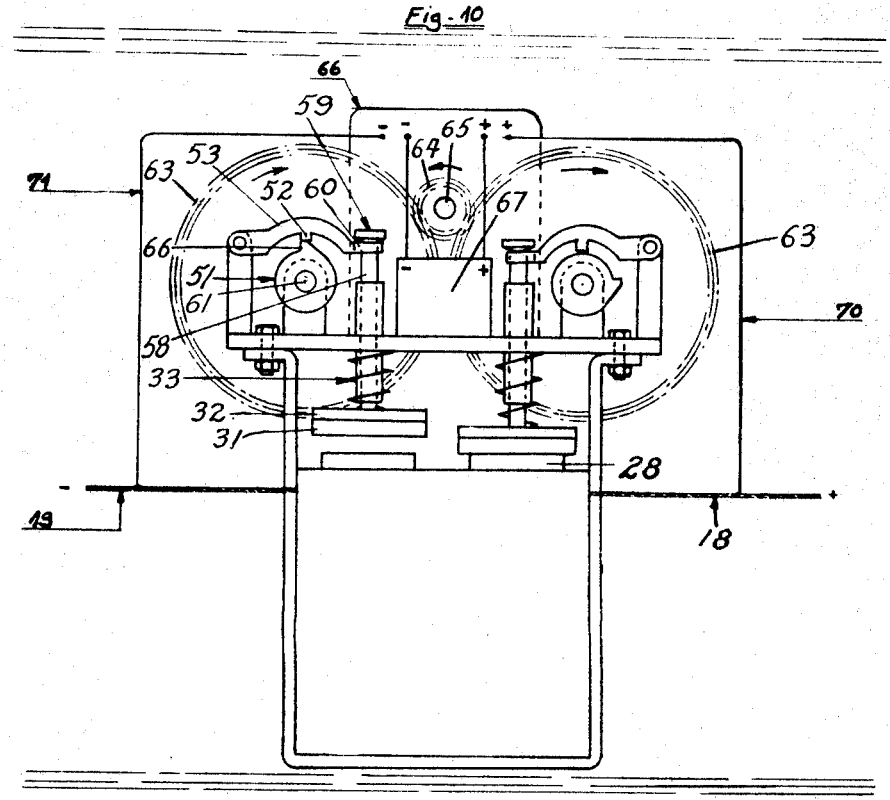

July 23, 1968     G. MAES     3,394,034
SALT WATER ELECTROLYTE BATTERY DEVICE
Filed March 1, 1966     6 Sheets-Sheet 6

United States Patent Office 3,394,034
Patented July 23, 1968

3,394,034
SALT WATER ELECTROLYTE BATTERY DEVICE
Guy Maes, Neuilly-sur-Seine, France, assignor to
L'Electronique Appliquee, Paris, France
Filed Mar. 1, 1966, Ser. No. 531,003
Claims priority, application France, Mar. 1, 1965,
7,425, Patent 1,435,048
15 Claims. (Cl. 136—162)

ABSTRACT OF THE DISCLOSURE

A salt water electrolyte battery is made of at least one stack of elementary battery cells having bare portions of an edge of their insulating salt water saturable spacers juxtaposed and cooperating with a watertight obturator. With the immersion of the device into salt water, a mechanism temporarily lifts the obturator from the juxtaposed bare portions of the spacers, thus enabling the salt water electrolyte to fill up the cells and thereafter re-applies the obturator for closing the cells and relatively isolating them. The mechanism may be so made as to repeat such operation from time to time during the immerged life of the battery device.

---

The present invention concerns improvements in or relating to salt water electrolyte battery devices.

Usually, such devices comprise a plurality of elementary battery cells which are interconnected in series or parallel and/or in series-parallel relation. Usually also no special precaution is taken against the existence of leakage currents from elementary cells to elementary cells or from stacks or such cells to other stacks of similar cells in a complete battery device. As such, devices are operating when immersed totally within the salt water medium, for instance when they form part of radio-buoys of any kind, such leakage currents, from points to points of different voltage values, produce an accelerated wear of the cells in the time and consequently considerably shorten the useful life of the device.

It is the object of the invention to provide such salt water electrolyte battery devices with structures substantially eliminating the above mentioned drawback, and which are all the more useful as the voltages are higher.

For explaining the invention in full detail, reference will be made to the accompanying drawings:

FIG. 1 shows a perspective view of an elementary battery cell provided in accordance with the present invention;

FIG. 2 shows a view of a stack of such elementary cells without any casing;

FIG. 3 shows a view of said stack when partially provided with a casing;

FIG. 4 shows a view of a unit constituted by two stacks such as the one in FIG. 2;

FIG. 5 shows a view of the unit of FIG. 4 after being embedded within a plastic material;

FIG. 6 shows a view of the unit of FIG. 5 after an operation has been made which leaves bare the openings provided in the elementary cells for the introduction of the salt water electrolyte into said cells;

Figure 7:
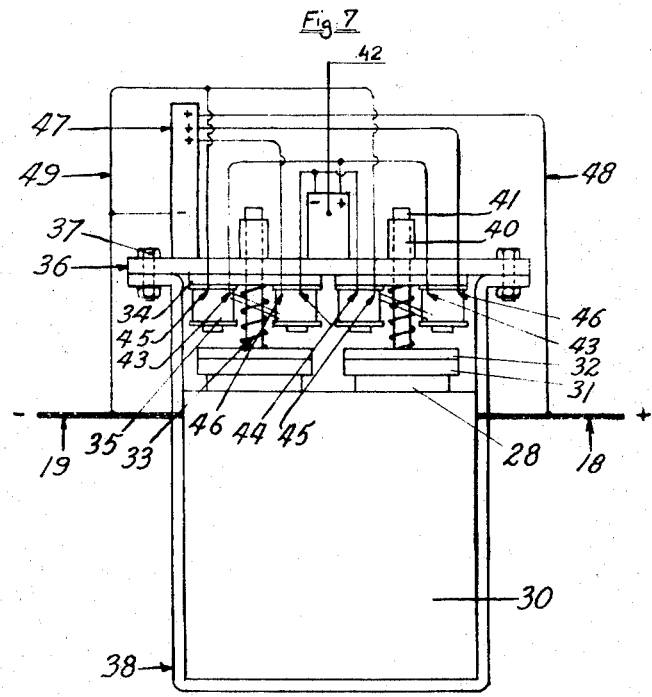
FIG. 7 shows an end view of an arrangement including the unit of FIG. 6 and provided with means for temporarily disengaging such openings of the cells it includes.
Figure 8:
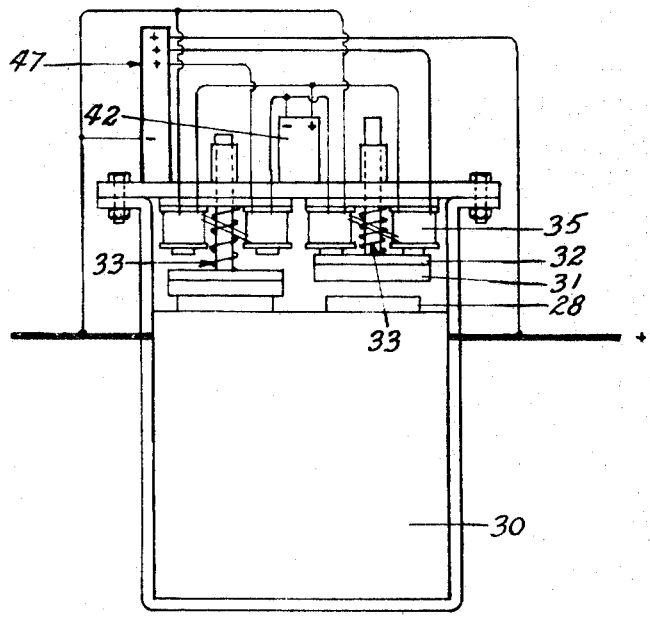
FIG. 8 shows a similar end view after the device has been brought within the salt water electrolyte.
Figure 11:
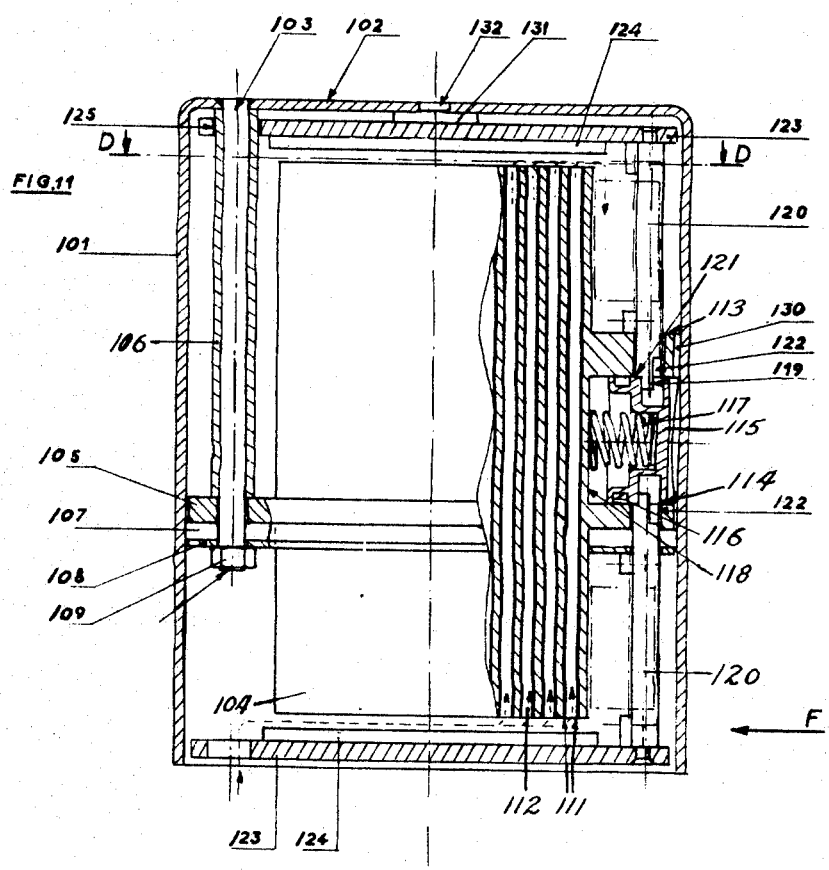
Figure 12:
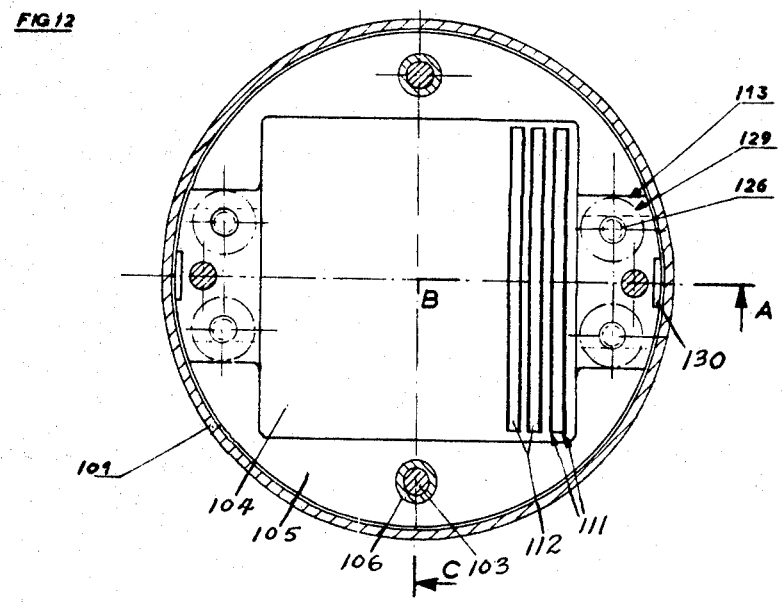
Figure 13:
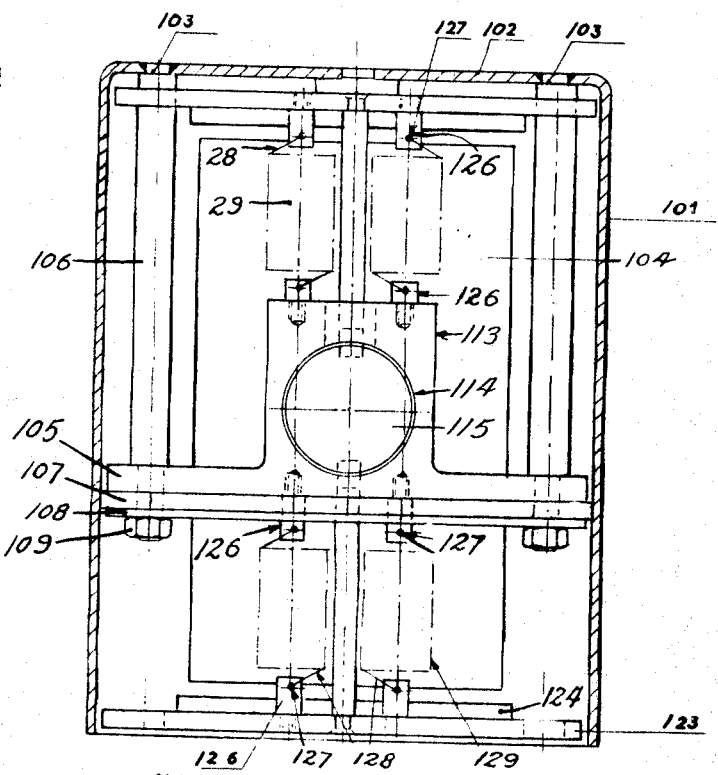
Figure 14:
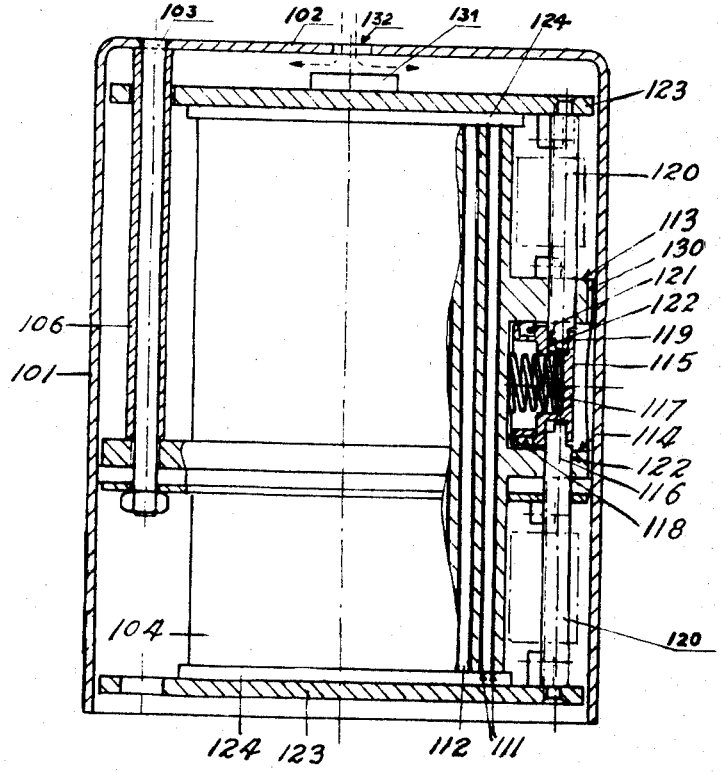

FIGS. 9 and 10 respectively show views similar to the views of FIGS. 7 and 8, but for a higher voltage device;

FIGS. 11 to 14 concern an alternative embodiment of the device shown in the preceding figures:

FIG. 11 shows a longitudinal cross-section taken on the lines A–B–C of FIG. 12;

FIG. 12 shows a transversal cross-section view taken on the line D—D of FIG. 11;

FIG. 13 shows a view taken on line F—F of FIG. 1, with the casing partially removed;

FIG. 14 shows a view similar to that of FIG. 11 after the battery device has been activated by immersing it within the salt water electrolyte medium.

From such illustrative embodiments, any technical modification of parts or assemblies may be contemplated wihtout any further need of specification and disclosure.

The elementary battery cell shown in FIG. 1 comprises a metal plate 1, for instance of zinc or magnesium, applied on one side of an insulating spacer 2 on the other side of which is applied a plate 3 of silver chloride for instance over which is coated a thin silver sheet 4.

The spacer plate 2 is saturable by the salt water electrolyte and for instance is made of a fabric of artificial textile threads. On one edge thereof, said spacer plate represents a protruding tongue 6. Over said tongue is placed a protective piece of adhesive ribbon.

A battery, in accordance with the present invention, comprises a plurality of such cells, five for instance in a stack as shown in FIG. 2, pinched between two wall-plates 11, girdled by adhesive ribbons 12. Such a stack is for instance coated with an insulating and waterproof material 13 such as a synthetic resin. The partitions 11 and the coating 13 only leave bare such parts as 14 of the external plates of the stack for enabling the electrical tappings and connections to be made for the use of the battery.

Several such stacks may be united in a group such as the one shown in FIG. 3, wherein they are shown piled and maintained by, for instance, adhesive tapes 16. The stack to stack connections are made for instance by metal bands or braids 17 soldered to the outputs of the plates of the active cells of the stack which are end ones in said stacks, such soldered connections being permitted by the bared portions 14. The input and output leads 18 and 19 are soldered or swaging on the metal plates of the first cell. A protective coating 20 is thereafter applied on the complete arrangement except for the protruding groups of tongues of the spacers.

It is obviously possible to assemble several units such as the one in FIG. 3 and, for instance, two such units as shown in FIG. 4, by means of braids or tapes such as 25. Such units are electrically connected from their output leads for instance, as shown at 26 and the whole may be placed within a mould for coating with a watertight insulating material such as a thermosetting or polymerisable resin.

After the coating operation, the battery device appears as a compact unitary block as shown in FIG. 5. Such a block is entirely tight and it suffices to insulate the two output leads from insulating plugs for instance 27 for enabling the device to be indefinitely placed in stock without any special care.

In order to use the battery, it is necessary to first abrade the blocks 28 overcoating the tongues of the spacers in order to obtain bare opening areas 29 of the tongues 6 so that access of the electrolyte may be obtained for each and any elementary battery cell. Of course, connections 18 and 19 are also cleaned of their overcoating material.

Such a battery unit is then in condition for mounting in the apparatus in which it will be used such, for example, as a radio buoy. Joints such as 31 are placed for closing the openings 29 and, for instance, such watertight joints are glued or otherwise affixed on magnetic carriers 32 urged by springs 33, as shown in FIGS. 7 and 8. These springs may be retained by yokes 34 of electro-magnets 35 affixed to a base plate 36 which is of a non-magnetic material. On said base plate are secured, by means of bolts 37 for instance, stirrup-pieces 38 supporting the battery unit 30. Guide-members 40 may be soldered on the plate 36 and guide rods 41 secured to the carriers 32 of the obturators 31.

Each one of the magnets 35 is provided with two windings, one for the activation thereof and the other one for the control of the magnet. A small capacity salt water battery 42, of any suitable conventional type, is connected across the terminals 43 and 44 of the activation windings of the electro-magnets. Each control winding is connected by its input 45 to one of the terminals of the battery unit 30 and its output 46 is connected to a pulse distributor mechanism 47 which will be fed from the battery unit after the energization thereof, from bleeders 48 and 49 connected across the terminal leads 18 and 19. Illustratively the pulse distributor mechanism may be of the rotating terminal switch kind with a small motor incorporated therein, the number of terminal contacts in said switch being equal to the number of obturators 31.

Such an arrangement maintains and preserves a complete watertightness during stockage and handling periods of time so that no risk of damaging may occur.

When the device is brought within the salt water medium, the sea for instance, the small battery 42 immediately starts and supplies the electro-magnet activation windings. Said magnets attract immediately the magnetic carriers 32 of the obturators 31 which consequently temporarily uncover the openings 29 of the cell spacers. The salt water electrolyte consequently can enter the spacers, forcing out the gas from said spacers. The battery unit 30 is activated and feeds the pulse distributor 47 whilst the small battery 42 cannot deliver any longer an energy capable of maintaining the magnets against the urge of the springs 33. The carriers 32 of the obturators 31 are therefore reapplied over the openings 29 of the battery spacers. All the elementary battery cells are operative but obviously electrically insulated from each other (except for their useful connections) so that no leakage currents can occur, as they are insulated from each other from the electrolyte point of view.

The pulse distributor is actuated and sequentially controls the electro-magnets of the various groups so that there is only one group which presents its openings 29 uncovered by its obturator at any instant of time, see FIG. 8. This is important for a good operation of the battery stacks; for instance each elementary cell has a voltage electro-motive force of 1.5 volts, each stack comprises five cells, hence a voltage difference of 7.5 volts across its terminals and, in the illustrated example, the potential difference between the first cell of the first stack and the last cell of the fourth stack is equal to 30 volts. Without the application of the invention, the leakage currents through the electrolyte in which the battery device is merged should have been high, and consequently quite deleterious to the useful life of the device.

The time interval useful for letting the gas generated in the cells to escape and the electrolyte to be removed is small and, for instance, equal to or of the order of six seconds each ten minutes. In such conditions, the leakage currents could at most exist in the worst case during one hundredth of the operating life of each stack, or something of same order of magnitude.

In the embodiment shown in FIGS. 7 and 8, the two rows of battery stacks are in parallel. When serially connected, the overall voltage difference doubles and it is not practically feasible to activate simultaneously the forty elements of the device. One may have recourse, in such a case, to a modification such as shown in FIGS. 9 and 10. Such modification only substitutes cams for electro-magnets. For instance, as shown, each cam 51 will act on a projection 52 of a lever 53 pivoted at 54 on a piece 55 secured to the base plate 56. Guides 57 admit the sliding of rods 58 which are threaded or otherwise secured to the carriers 32 of the obturators 31 (said carriers do not need to be magnetic in this embodiment). Rods 58 terminate in heads 59 under which forks 60 which terminate the levers 53 are placed.

The cams 51 are affixed on shafts 61 which are journalled in bearings 62 secured to the base plate 56. One end of the shafts 61 carriers toothed wheels 63 engaging a pinion or gear-wheel 64 controlled from the output shaft 65 of an electric clock mechanism 66, watertight and also carried by the base plate 56. A battery 67 is mounted on the plate 56 and is connected at 68 and 69 to the electric motor included in said mechanism. Further connections 70 and 71 are connected to said motor, bleeding from leads 18 nad 19 of the battery unit supported from the base plate 56 by means of braids such as 38.

When the device is within salt water, the battery 67 is activated and feeds the motor of the clock mechanism 66 which by its output shaft 65 and the pinion-wheel 64, drives the wheels 63 connected to the shafts 61 on which are secured the cams 51. The relative positions of said cams on said shafts are such that their raised portions contact the ends of levers 53 at different time instants of a repeatedly made time-scaled cycle. Each time the raised portion 66 of a cam passes under the part 52 of the corresponding lever 53, this lever is lifted up and by the head 59 drives a rod 58 in the carrier 32 of the obturator 31. This obturator then uncovers the openings 29. The raised portion 66 thereafter escapes the projection 52, the lever 53 falls back and the spring 33, acting on the carrier 32, applies the obturator on the block 28 consequently closing the openings 29 of the stack. All the stacks having so been activated in a sequence, the operation is normal and the electric motor in the clock mechanism is fed from the leads 18 and 19, hence the repetitive operation of the arrangement during the complete life of the device.

Of course, the battery 50 might be cut off if desired after the battery stacks have been activated, for instance from the insertion of unidirectionally conducting elements in the links between the leads of current to the motor with such reversed orientation that the voltage from the battery device blocks them, hence blocks the current from the small battery 67.

Obviously, it would not be necessary in all cases to provide a repetitive operation of disengagement of the obturators for renewing the electrolyte within the elementary battery cells. In such a case, the modification of the arrangement is obvious since it consists to cancel all the parts described for the repetition of disengagement and control thereof.

In order to facilitate the filling of the spacers and the evacuation of the gas from the elementary cells, two opposite sets of openings may be provided in said spacers, then each opening group will cooperate with a separate obturator, but the control of said obturators will be a single one.

From these two last explained points of view, as well as for introducing a further advantage, that of cleaning the spacers of the cells when filling them up with the salt water electrolyte, and consequently not having to ensure tightness of the openings during the stocking and handling periods, a further embodiment of the invention is shown in FIGS. 11 to 14. In this embodiment, the block of cells is shown at 4, and some active cells thereof are partially shown in cross-section for showing their saturable insulating spacers 12, said spacers being provided with openings at two opposite ends thereof (bottom and top edges in the figures.)

The battery unit is mounted within a cylindrical casing 101, open at its bottom end and closed at its top by a wall 102. By means of rods such as 103, soldered in said wall for instance, is supported a ring 105 carrying the battery cell unit under which is arranged a watertightness annular joint 107 over a base plate 108 of same shape as 107. Struts 106, sleeved over the rods 103, ensure the suitable spacing between the wall 102 and the ring 105 and nuts such as 109 threaded on threaded parts such as 110 of rods 103, block the arrangement so that within the casing 101 is thus created a watertight compartment above joint 107 and in said compartment open one end of the bare portions of the spacers of the cells. The opposite end openings of said spacers are located on the other hand in the open portion of the casing 101. The ring 105 supports the battery unit 104 and ensures the watertightness between itself and the lateral wall of said unit.

Above joint 107 the ring 105 presents embossings such as 113 wherein are provided cylinders such as 114 and piston-rods such as 115, provided with tightness joints 116; said piston-rods are repelled by springs 117 applying against the bottoms 118 of the cylinders 114 in which they are housed. These piston-rods are arrested by fingers 119 which terminate rods 120 a talon 121 of which applies on said fingers. Rods 120 are guided within pieces 113 and 105. The two lower rods pass through joint 107, so that the watertightness of the upper compartment of the casing is not destroyed. These rods are secured, by riveting for instance, on obturators comprising lids provided with plastic joints 124. The upper lid comprises holes for the passage of the struts 106. In either lid are secured studs such as 126 and corresponding studs are secured to the pieces 105 and 113. These studs are bored with holes such as 127 for the passage of end loops 128 of springs 129. These springs urge the lids towards the bare edge portions of the spacers 112 of the battery unit 104. They cannot close said openings because, FIGS. 1 to 3, the rods 120 inhibit such a motion as being maintained by the piston-rods 115.

The wall 102 is provided with a central opening 132 obturated in rest periods for the device by a joint 131 which is mechanically connected to the upper lid 123 (for instance glued over said lid).

Passages such as 130 are provided in the embossings 113 for enabling the electrolyte or the gas to reach the outer faces of the piston-rods 115.

The operation may be explained as follows: When the device is placed within the water, the hydrostatic pressure being higher than the atmospheric pressure (this is the case for a radio or sonic buoy or the like), the salt water penetrates the closed compartment through the saturable spacers of the battery cells and, through said spacers, falls on the top of the ring 105 and the joint 107. Such a water circulation through the spacers carries out of said spacers any air or gas bubbles which may have remained therein on the surfaces of the active metal plates of the cells. This circulation and cleaning continues up to the point that, through the passages 130, the overgrowing pressure of gas exerts on the outside faces of the piston-rods an action which overcomes the spring-bias from springs 117 (of course, said springs have been properly balanced for such action in any required pressure condition). The piston-rods go backward, disengage the talons 121 of the rods 120 which slide in the housings 122 of the pieces 113 and 105 and, under the action of the springs 129, the lids 123 apply over the juxtaposed openings of the cell spacers, their joints 124 rendering said closure watertight. The battery device is consequently activated and the elements thereof are duly isolated from each other and from the outside, no leakage electrical current may be generated during the useful life of the device. See FIG. 4 for this activated condition of the device.

The lowering of the upper lid had opened the opening 132, the compartment fills with water thus equilibrating the presses on both sides of joint 107. During the life of the device, so doing, no stress is applied on any mechanical part of the arrangement.

Any gas generation of too much importance will create a pressure within the battery stacks such that the lids will be slightly disengaged from the openings of the spacers against the force of springs 129; the occluded gas being evacuated, the lids close again.

Such an arrangement is free from temperature and life duration changes; once activated it is free from any pressure conditions too. Of course, the adjustment of the springs 117 is so made as to ensure the watertightness of the battery device before the actual water hydrostatic pressure surrounding the device is reached.

What is claimed is:

1. A salt water electrolyte battery device for operation during its immersion within a salt water medium, comprising the combination of at least one stack of elementary battery cells each of which comprises between its active metal plates an insulating spacer saturable by the salt water electrolyte and one edge at least of which is bare on at least one portion of said edge, such bare portions of edges of said insulating spacers being juxtaposed in a stack, a watertightness obturator for cooperation with such juxtaposed bare portions of said spacers in a stack, and means responsive to the immersion of the battery device within said salt water medium for successively controlling the filling up to saturation of said spacers from said bare portions and the subsequent application of said watertightness obturator onto said juxtaposed bare portions of said spacers of elementary battery cells.

2. A salt water electrolyte battery device according to claim 1, wherein said obturator is applied to said juxtaposed bare portions prior to the immersion of said device within said salt water medium and said means for filling up to saturation said spacers include means for temporarily disengaging said obturator from said bare portions.

3. A salt water electrolyte battery device according to claim 1, wherein said obturator is disengaged from said juxtaposed bare portions of spacers prior to the immersion of said device within said salt water medium and said means for filling up to saturation said spacers comprise means for passing said salt water medium through said spacers to a closed compartment and said means for application of said obturator onto said juxtaposed bare portions of spacers include means responsive to pressure within said compartment.

4. A salt water electrolyte battery device according to claim 3, wherein said stack comprises two oppositely provided groups of juxtaposed bare portions of the spacers of its elementary battery cells, one of which is located within said closed compartment and the other of which is located within a free access compartment, said obturator comprises two parts facing said two juxtaposed bare portion groups, said pressure responsive means include spring-opposed slidable members locking said obturator parts disengaged from said juxtaposed bare portion groups up to the retraction of said springs from the increase of pressure within said closed compartment when filling with the salt water electrolyte through said spacers.

5. A salt water electrolyte battery device according to claim 4, wherein said obturator parts are spring actuated for their application to said juxtaposed bare portions.

6. A salt water electrolyte battery device according to claim 2, wherein said means for temporarily disengaging said obturator from said juxtaposed bare portions of spacers include electro-mechanical means temporarily actuated from the activation of a small capacity salt water electrolyte battery.

7. A salt water electrolyte battery device according to claim 6, wherein said electro-mechanical means include electro-magnets temporarily activated from said small capacity salt water electrolyte battery.

8. A salt water electrolyte battery device according to claim 6, wherein said electro-mechanical means include cam and lever arrangement, an electric motor for actuating said cam and lever arrangement and supplied from the activation of said small capacity salt water electrolyte battery.

9. A salt water electrolyte battery device according to claim 6, wherein an electric clock timing mechanism is inserted between said electro-mechanical means and said small capacity salt water electrolyte battery.

10. A salt water electrolyte battery device according to claim 1, comprising a plurality of distinctly mounted stacks of elementary battery cells with as many separate obturators as are stacks in said plurality, wherein said obturators are separately controlled.

11. A salt water electrolyte battery device according to claim 1, wherein further means are provided for temporarily disengaging said obturators from their respective cooperating juxtaposed bare portions of spacers from time to time during the immersion of the device within said salt water medium.

12. A salt water electrolyte battery device according to claim 11, wherein said means comprise the combination of a timing mechanism, of electro-mechanical means controlling such temporary disengagements under the control of said timing mechanism, and a derivation from a feeder supplied from the electrolyte battery proper for activation of said timing mechanism.

13. A salt water electrolyte battery device according to claim 2 and comprising a plurality of distinctly mounted stacks of elementary battery cells with as many separate obturators as are stacks in said plurality, wherein said means for temporarily disengaging said obturators from said juxtaposed bare portions include means for sequentially controlling the operation of said temporary disengagement means individual to said stacks.

14. A salt water electrolyte battery device according to claim 3 and comprising a plurality of distinctly mounted stacks of elementary battery cells with as many separate obturators as are stacks in said plurality, wherein as many closed compartments exist as are stacks in said plurality.

15. A salt water electrolyte battery device according to claim 6, wherein further means are provided for temporarily disengaging said obturators from their respective cooperating juxtaposed bare portions of spacers from time to time during the immersion of the device within said salt water medium, wherein said means for temporarily disengaging the obturators include common electro-mechanical control means and said further means include automatic switching means connected to the output of said small capacity salt water battery to a bleeder from the output of the battery device for activation of said electro-mechanical means when said bleeder carries an electrical current.

References Cited

UNITED STATES PATENTS

| | | | |
|---|---|---|---|
| 2,852,593 | 9/1958 | Chubb et al. | 136—91 |
| 2,886,621 | 5/1959 | Hinman | 136—162 XR |
| 3,306,775 | 2/1967 | Burant et al. | 136—90 |
| 3,313,657 | 4/1967 | Wood | 136—90 |

WINSTON A. DOUGLAS, *Primary Examiner.*

D. L. WALTON, *Assistant Examiner.*

UNITED STATES PATENT OFFICE
CERTIFICATE OF CORRECTION

Patent No. 3,394,034                      July 23, 1968

Guy Maes

It is certified that error appears in the above identified patent and that said Letters Patent are hereby corrected as shown below:

Column 2, lines 20 and 21, "represents" should read -- presents --. Column 3, line 60, "removed" should read -- renewed --.

Signed and sealed this 13th day of January 1970.

(SEAL)

Attest:

Edward M. Fletcher, Jr.

Attesting Officer

WILLIAM E. SCHUYLER, JR.

Commissioner of Patents